United States Patent [19]
Quinn

[11] Patent Number: 5,944,786
[45] Date of Patent: Aug. 31, 1999

[54] AUTOMATIC NOTIFICATION OF RECEIPT OF ELECTRONIC MAIL (E-MAIL) VIA TELEPHONE SYSTEM WITHOUT REQUIRING LOG-ON TO E-MAIL SERVER

[76] Inventor: Ken Quinn, 207 Idylwyld Dr., South, Saskatoon, Canada, S7M 1L6

[21] Appl. No.: 08/767,130

[22] Filed: Dec. 4, 1996

[51] Int. Cl.⁶ .................................................. G06F 13/00
[52] U.S. Cl. .................. 709/206; 379/88.12; 379/88.13; 379/88.15; 379/93.24
[58] Field of Search .............................. 395/200.36, 680; 358/402; 379/89, 88.12, 88.13, 88.15, 93.24

[56] References Cited

U.S. PATENT DOCUMENTS

| | | | |
|---|---|---|---|
| 4,956,860 | 9/1990 | Murata | 379/100 |
| 5,057,935 | 10/1991 | Williams | 358/402 |
| 5,121,423 | 6/1992 | Morihiro et al. | 379/142 |
| 5,138,653 | 8/1992 | Le Clercq | 379/96 |
| 5,177,780 | 1/1993 | Kasper et al. | 379/59 |
| 5,293,250 | 3/1994 | Okumura et al. | 358/402 |
| 5,317,628 | 5/1994 | Misholi et al. | 379/89 |
| 5,333,266 | 7/1994 | Boaz et al. | 395/200 |
| 5,349,636 | 9/1994 | Irribarren | 379/89 |
| 5,384,832 | 1/1995 | Zimmerman et al. | 379/67 |
| 5,406,557 | 4/1995 | Baudoin | 370/61 |
| 5,475,738 | 12/1995 | Penzias | 379/67 |
| 5,487,100 | 1/1996 | Kane | 379/57 |
| 5,495,610 | 2/1996 | Shing et al. | 395/600 |
| 5,590,178 | 12/1996 | Murakami et al. | 379/96 |
| 5,649,003 | 7/1997 | Kapsales et al. | 379/201 |
| 5,675,507 | 10/1997 | Bobo, II | 364/514 R |
| 5,742,668 | 4/1998 | Pepe et al. | 379/58 |
| 5,748,884 | 5/1998 | Royce et al. | 395/185.1 |
| 5,757,891 | 5/1998 | Wang | 379/93.24 |
| 5,764,898 | 6/1998 | Tsuji et al. | 395/200.36 |
| 5,790,790 | 8/1998 | Smith et al. | 395/200.36 |
| 5,802,166 | 9/1998 | Garcia et al. | 379/372 |
| 5,805,810 | 9/1998 | Maxwell | 395/200.36 |

*Primary Examiner*—Lance Leonard Barry
*Attorney, Agent, or Firm*—Murray E. Thrift; Adrian D. Battison

[57] ABSTRACT

The automatic e-mail notification system provides for the automatic notification of an e-mail recipient of the presence of e-mail in the recipient's e-mail box on a remote e-mail server. The automatic e-mail notification system comprises an e-mail server connected through a computer network to one or more computer systems for receiving e-mail from the computer systems. The e-mail server is also connected through the computer network to a mail notification server and a notification device at a recipient's location. The notification device is activated and deactivated by a signal from the mail notification server. The e-mail server generates and sends a data signal containing a message received signal or a message retrieved signal to the mail notification server. The mail notification server in turn generates a notification signal which is sent using the subscriber's phone number to the subscriber's telephone node thereby activating or deactivating the notification device in response to a respective one of the message received or message retrieved signals. The mail notification server may be included as part of a telephone system voice messaging system. In this case the mail notification server controls the voice messaging system which generates and sends the notification signal.

10 Claims, 11 Drawing Sheets

AUTOMATIC NOTIFICATION OF RECEIPT OF ELECTRONIC MAIL (E-MAIL) VIA TELEPHONE SYSTEM WITHOUT REQUIRING LOG-ON TO E-MAIL SERVER

FIELD OF THE INVENTION

The present invention relates to electronic mail notification systems, particularly of the type which notify a recipient of the presence of electronic mail on a remote electronic mail server.

BACKGROUND

In recent years a system of sending electronic mail (e-mail) from a sending computer to a receiving computer has been established through the Internet. The sending computer communicates an e-mail message to an addressed mailbox on an e-mail server where it is stored. The e-mail message is usually stored in the mailbox until the recipient retrieves it at which time the e-mail is usually deleted. The e-mail recipient has no way of knowing when e-mail has reached the e-mail server except by checking his mailbox. This can be a time consuming and frustrating task since there is often no e-mail in the mailbox and the time spent checking has been wasted.

Several prior solutions are know which have attempted to solve this problem. These include the use of pagers, faxes, and automated telephone calls to notify the recipient when the e-mail server has received e-mail. Pagers and automated telephone calls require that the recipient respond to the page or telephone call which can be inconvenient and can be a cause of annoyance to the recipient. Faxes require an expensive fax machine which in many cases makes this solution impractical. These solutions also have the draw back that they do not allow the recipient to check at will whether or not e-mail has arrived but instead require the recipient to respond to a notification which is sent according to timing dictated by the e-mail service provider.

Another prior attempt at solving this problem has been provided by Okumura et al, in U.S. Pat. No. 5,293,250 entitled SYSTEM FOR NOTIFYING A DESTINATION TERMINAL THAT ELECTRONIC MAIL HAS REACHED A HOST COMPUTER. The system taught by Okumura requires the sending computer have specialized notification software. The sending computer generates e-mail for communication to a host computer. A notification signal is then manually generated by the sender using the specialized notification software and is transmitted to the host computer with the e-mail. The host computer includes specialized software for receiving the e-mail notification signal and for notifying the recipient computer. This system has two important problems associated with it. The first problem is that specialized notification software is required at the sending computer and that the sender must manually go through the steps of notifying the host computer that e-mail has been sent. The second problem is that this system does not lend itself to use on the Internet since it would require that the recipient computer be left on at all times so that it is available to receive a notification message from the host computer.

Two other patents which are related to this field are Penzias U.S. Pat. No. 5,475,738, entitled INTERFACE BETWEEN TEXT AND VOICE MESSAGING SYSTEMS, and Zimmerman et al U.S. Pat. No. 5,384,832, entitled METHOD AND APPARATUS FOR A TELEPHONE MESSAGE ANNOUNCING DEVICE.

Penzias teaches a text to speech interface connected to one or more networked computer systems for converting a text e-mail message into a voice message. The voice message is communicated over the telephone network to a voice mail system. This system enables a user to simultaneously send a text e-mail message to a recipient via an e-mail system and a voice mail message generated from the text message to the same recipient's voice mail system via a telephone system.

Zimmerman et al teaches a telephone message notification device for connection to a telephone and having an indicator light for notifying a recipient that a voice message has been received on a telephone voice messaging system.

As well as the prior art above, automated messaging systems for use with voice mail are known and many telephone companies offer a voice message delivery service under various names. This service allows telephone voice message system subscribers to access an automatic voice message system for callers to leave a message if the subscriber is not answering or if the telephone line is busy. Various methods of notification are used to notify a subscriber that voice mail has been received. A stutter dial tone is utilized by some voice mail systems. The stutter dial tone is heard by the subscriber when the telephone receiver is picked up thus notifying the recipient that a message is present in the voice mailbox. Some telephones may include an indicator lamp or text message display for notifying a voice mail recipient that voice mail has been received. In this case a special visual message waiting signaling unit sends a signal to a special electronic circuit within a telephone which activates an LED/Neon flashing lamp connected to the telephone, or sends a text message to a text display. A signal is sent when voice mail has been received to activate the light and/or display the text and is sent again when the voice-mail has been deleted from the voice-mail box to deactivate the light and/or the text. These signals are usually standard signals. In North America and countries that use similar systems, such as Japan, Australia, and Singapore the signals used follow the Bellcore standard.

SUMMARY

According to one aspect of the present invention there is provided a method of automatically notifying a recipient of the presence of e-mail on an e-mail system comprising:

sending e-mail from at least one computer to at least one e-mail server;

receiving and storing the e-mail on the at least one e-mail server;

automatically generating a data signal at the at least one e-mail server and communicating said data signal from the e-mail server to a mail notification server, said data signal including an e-mail received signal;

generating a notification signal at the mail notification server in response to the data signal, said notification signal comprising a notification means activation signal;

communicating the notification signal to an addressable node;

providing a notification means connected to the addressable node, said notification means being switchable between an activated state and a deactivated state;

receiving the notification signal at the notification means and activating the notification means in response to the activation signal, thereby notifying a person that e-mail has been received on the e-mail server.

Preferably the method includes the steps of:

requesting and receiving e-mail from the least one e-mail server over the e-mail system to at least one receiving computer;

automatically generating a data signal at the at least one e-mail server and communicating said data signal from said e-mail server to the mail notification server, said data signal including an e-mail retrieved signal;

generating a notification signal at the mail notification server in response to the data signal, said notification signal comprising a notification means deactivation signal;

communicating the notification signal to an addressable node;

receiving the notification signal at the notification means and deactivating the notification means in response to the deactivation signal.

According to a second aspect of the present invention there is provided a method of automatically notifying a recipient of the presence of e-mail on an e-mail system comprising:

sending e-mail from at least one computer to at least one e-mail server;

receiving and storing the e-mail on the at least one e-mail server;

automatically generating a data signal at the at least one e-mail server and communicating said data signal from the e-mail server over the e-mail system to a telephone system having a voice messaging system, said data signal including an e-mail received signal;

automatically generating a notification signal at the voice messaging system in response to the data signal, said notification signal comprising a notification means activation signal;

communicating the activation signal to a telephone node connected to the telephone system;

providing a notification means connected to the telephone node, said notification means being switchable between an activated state and a deactivated state;

receiving the activation signal at the notification means and activating the notification means in response thereto, thereby notifying a person that e-mail has been received on the e-mail server.

Preferably the method includes the steps of:

requesting and receiving e-mail from the at least one e-mail server over the e-mail system to at least one receiving computer;

automatically generating a data signal at the at least one e-mail server and communicating said data signal from said e-mail server to the telephone system, said data signal including an e-mail retrieved signal;

automatically generating a notification signal at the voice messaging system in response to the data signal, said notification signal comprising a notification means deactivation signal;

communicating the deactivation signal to a telephone node connected to the telephone system;

receiving the deactivation signal at the notification means and deactivating the notification means in response thereto.

According to a third aspect of the invention there is provided an automatic electronic mail notification system comprising:

a computer network comprising:

at least two addressable computers having means for sending and receiving e-mail over the computer network;

and at least one addressable e-mail server having means for communication of e-mail over the computer network, means for storing the e-mail in an addressable mail box having a recipient identifier associated therewith, and means for automatically generating and communicating a data signal over the computer network;

at least one telephone system comprising:

a computer network interface means for receiving the data signal over the computer network;

at least one telephone node connected to the telephone system;

a voice messaging system having means for automatically generating a notification signal in response to the data signal, and means for communicating the notification signal over the telephone system to the at least one telephone node;

and notification means connected to each said at least one telephone node having indicator means for notifying the recipient of the receipt of the e-mail in response to the notification signal;

and data communication means connecting the at least two computers, the at least one e-mail server, and the at least one telephone system to one another for communication of data signals therebetween.

The automatic e-mail notification system provides for the automatic notification of an e-mail recipient of the presence of e-mail in the recipient's e-mail box on a remote e-mail server. The e-mail server is usually located at an Internet Service Provider, a telephone company connected to the Internet, or other similar e-mail service provider. The e-mail server automatically communicates an e-mail received data signal to a telephone system messaging system which in turn communicates a notification signal to an indicator on a telephone or similar notification means which is situated at the recipient's location. This allows the recipient to check for e-mail at any time and does not require that the sender or recipient perform any additional tasks or require any additional specialized software on the their computers. All of the required software is resident on the e-mail server and/or at the telephone company.

This system also allows for e-mail to be forwarded from the e-mail server over the telephone system and then be displayed on a display screen connected to the recipient's telephone or on a display screen connected to a notification device thus allowing an individual to view e-mail deposited on the e-mail server without turning on his/her computer.

BRIEF DESCRIPTION OF THE DRAWINGS

In the accompanying drawings, which illustrate an exemplary embodiment of the present invention.

DETAILED DESCRIPTION

Figure 1:
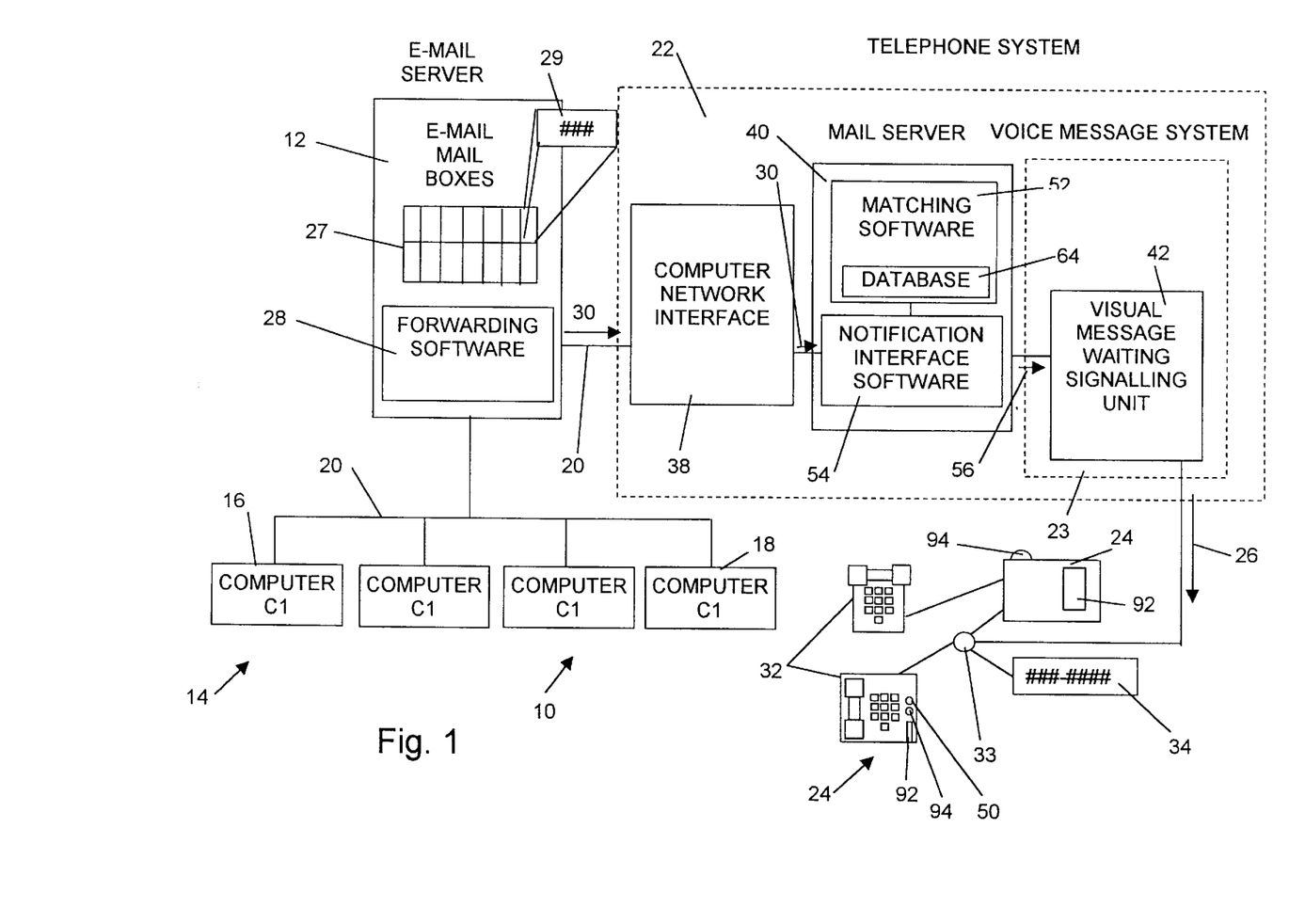
FIG. 1 is a schematic of the e-mail notification system with the notification interface software resident on the telephone system.

Referring to FIG. 1 the automatic e-mail notification system is shown generally at 10. The automatic e-mail notification system 10 comprises an e-mail server 12 connected through a computer network to one or more computer systems 14. The computer system(s) 14 comprise at least two addressable computers 16 and 18, each including means for sending and receiving e-mail over the computer network to the e-mail server 12. The e-mail server 12 is connected through the computer network to a notification device 24 at a recipient's location for receiving a notification signal 26.

The computer network is arranged to transfer data signals across data communication means 20 between the sending and receiving computers 16 and 18 and the e-mail server 12, and between the e-mail server 12 and the notification device 24. The data communications means 20 may be any appropriate means of communicating data, some examples of which are a standard telephone system 22 for communicating voice and data between remote locations, cable systems such as those currently being used for the communication of television and other signals, cellular telephone nets which like the standard telephone systems communicate voice and data between remote locations, and other communications systems such as those using transmission and reception of radio waves. The Internet is the most common means of communicating e-mail between remote locations and usually utilizes a standard telephone system.

The e-mail server 12 is located remote of the computer system 14, at an Internet service provider, a telephone company, a cable company, or other e-mail service provider's location. The e-mail server 12 comprises an addressable computer having specialized e-mail communication and storage software resident on the computer. E-mail communication and storage software is well known and many types are commercially available. The e-mail communication and storage software allows for a remote sending computer to send an e-mail message to the e-mail server 12. The e-mail message is stored in a recipient's mailbox 27 which has a recipient identifier code 29 associated with it. A recipient computer may then communicate with the e-mail server 12 and retrieve the e-mail from the recipient addressed mailbox 27. Generally, e-mail system interface software is also resident on the sending and receiving computers 16 and 18 which allows the computers 16 and 18 to send and receive e-mail over the computer network.

The e-mail server 12 also utilizes specialized forwarding software 28. The forwarding software 28 generates and forwards a data signal 30 over the computer network to a mail notification server 40 when e-mail is received in a recipient's mailbox 27. The mail notification server 40 is incorporated into the telephone system 22 and is linked to a telephone system voice messaging system 23. The mail notification server 40 controls the voice messaging system 23 which generates and sends the notification signal 26 to the notification means 24.

Figure 5:
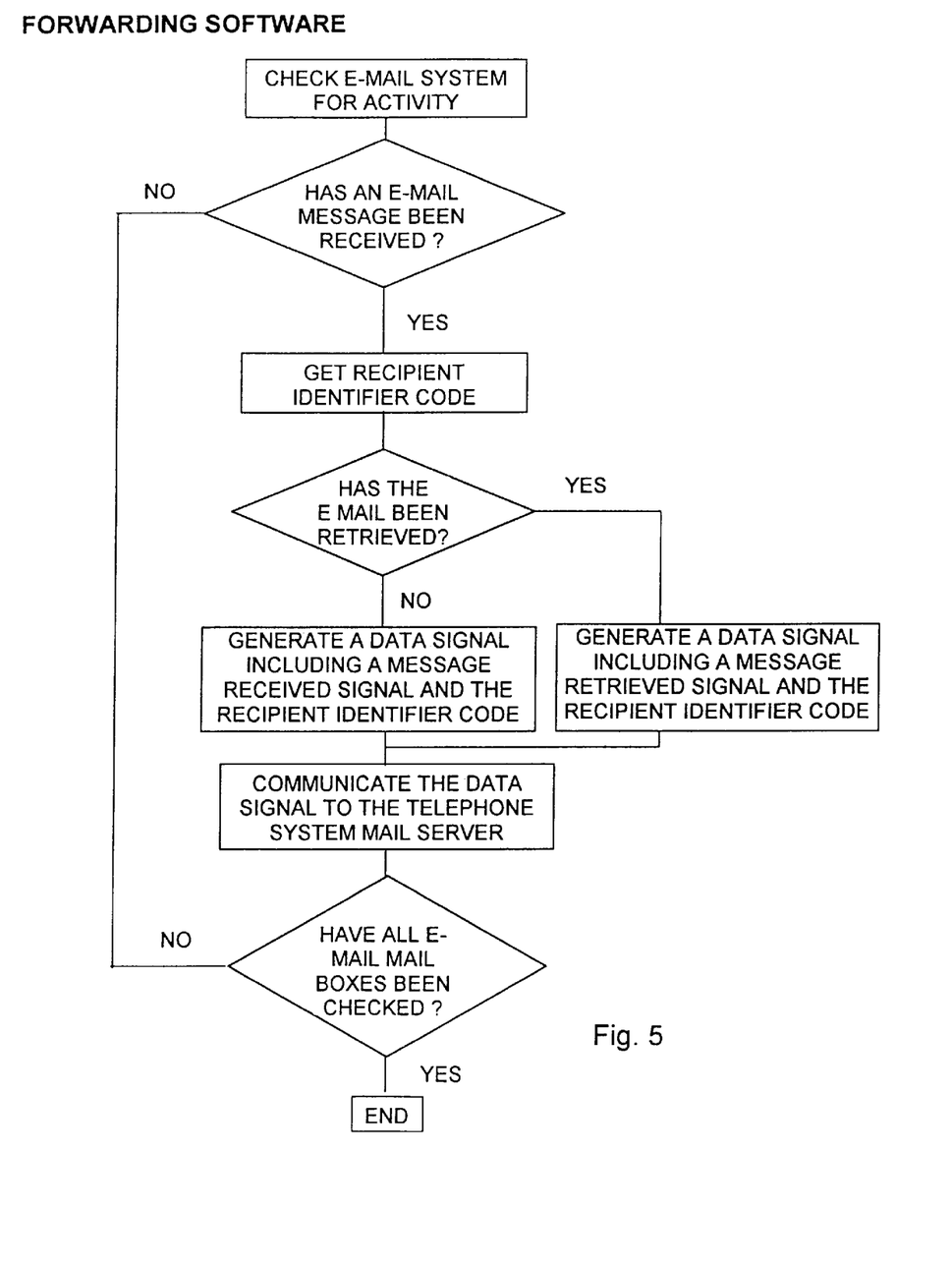
FIG. 5 is a flow chart showing the operation of the Forwarding software.

Referring to FIGS. 1 and 5, the forwarding software 28 monitors the status of the e-mail mailboxes 27 for activity 41. If e-mail has been received 43 the forwarding software 28 reads 45 the recipient identifier code 29, and checks whether or not the e-mail has been retrieved 47 by the recipient. If e-mail is present and has not been retrieved the forwarding software 28 generates 49 a data signal 30 containing a message received signal and the recipient identifier code 29. The data signal 30 is then forwarded 51 to the mail notification server 40. Alternatively, if the e-mail has been retrieved the forwarding software 28 generates 53 a data signal 30 containing a message retrieved signal and the recipient identifier code 29. The data signal 30 is then also forwarded 51 to the mail notification server 40. The forwarding software 28 then checks the remaining mailboxes 27 for activity.

Referring to FIG. 1 the telephone system 22 includes one or more telephones 32, each being connected at a telephone node 33 having a telephone number 34 associated with it. The telephone system 22 also includes a computer network interface means 38, the voice messaging system 23, the mail notification server 40, and the e-mail notification device 24.

The computer network interface means 38 receives the data signal 30 from the e-mail server 12 over the computer network and communicates the data signal 30 to the mail notification server 40.

To enable the automatic e-mail notification system 10 to be used with a telephone voice messaging system 23 the mail notification server 40 has been added to the telephone system 22. The mail notification server 40 is arranged to receive the data signal 30 from the computer network interface means 38 and incudes matching software 52 for matching the recipient identifier code 29 to a subscriber identifier code 48, shown in FIG. 6, on the voice messaging system 23, and notification interface software 54 for generating and sending voice message system commands 56 to the voice messaging system 23, in response to the data signal 30, thereby prompting the voice messaging system 23 to generate the appropriate notification signal 26.

Figure 6:
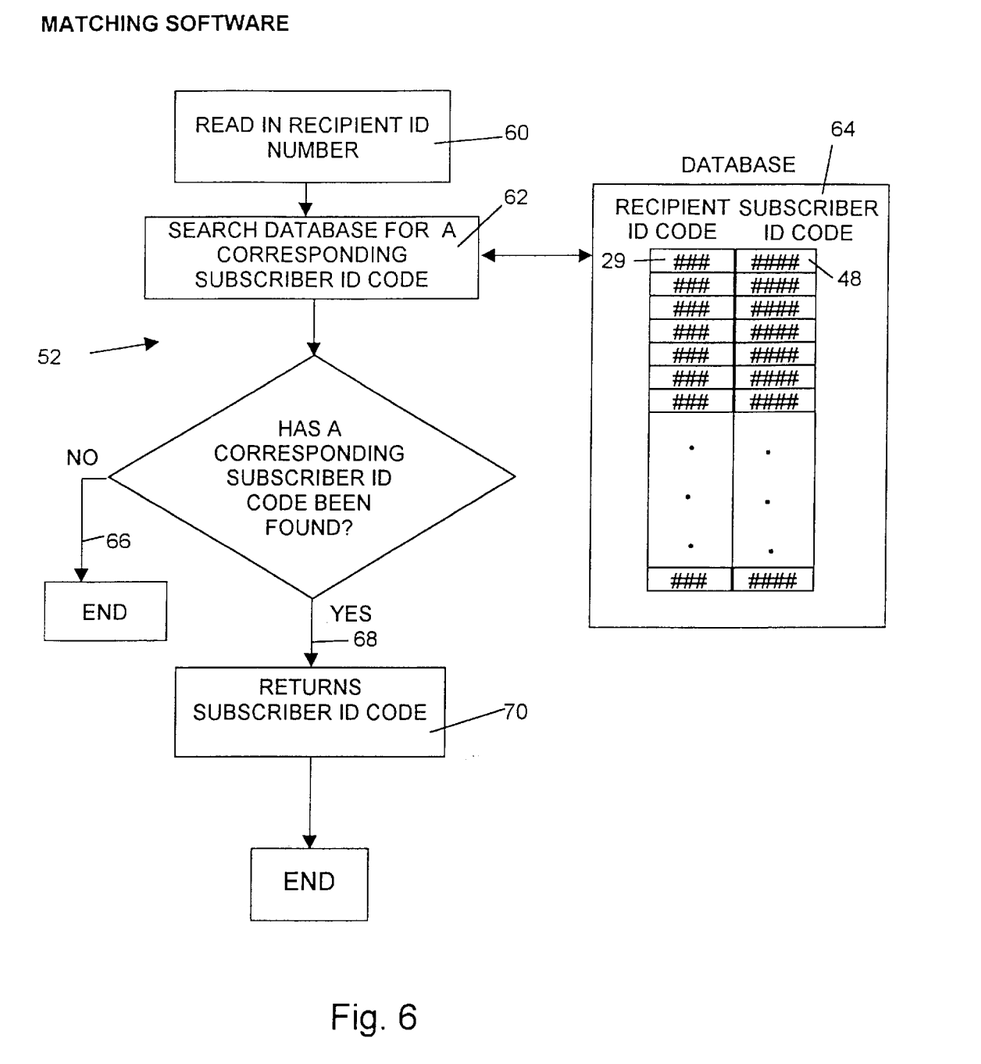
FIG. 6 is a flow chart showing the operation of the Matching software.

Referring to FIGS. 1 and 6, the matching software 52 reads in 60 a recipient identifier code 29 and searches 62 a database 64 for a subscriber identifier code 48 corresponding to the recipient identifier code 29. If a corresponding subscriber identifier code 48 is not found then the matching software ends 66 and no signal is sent to the voice messaging system 23. If a corresponding subscriber identification code 48 is found the matching software passes 70 the subscriber identifier code 48 to the notification interface software 54.

Figure 7:
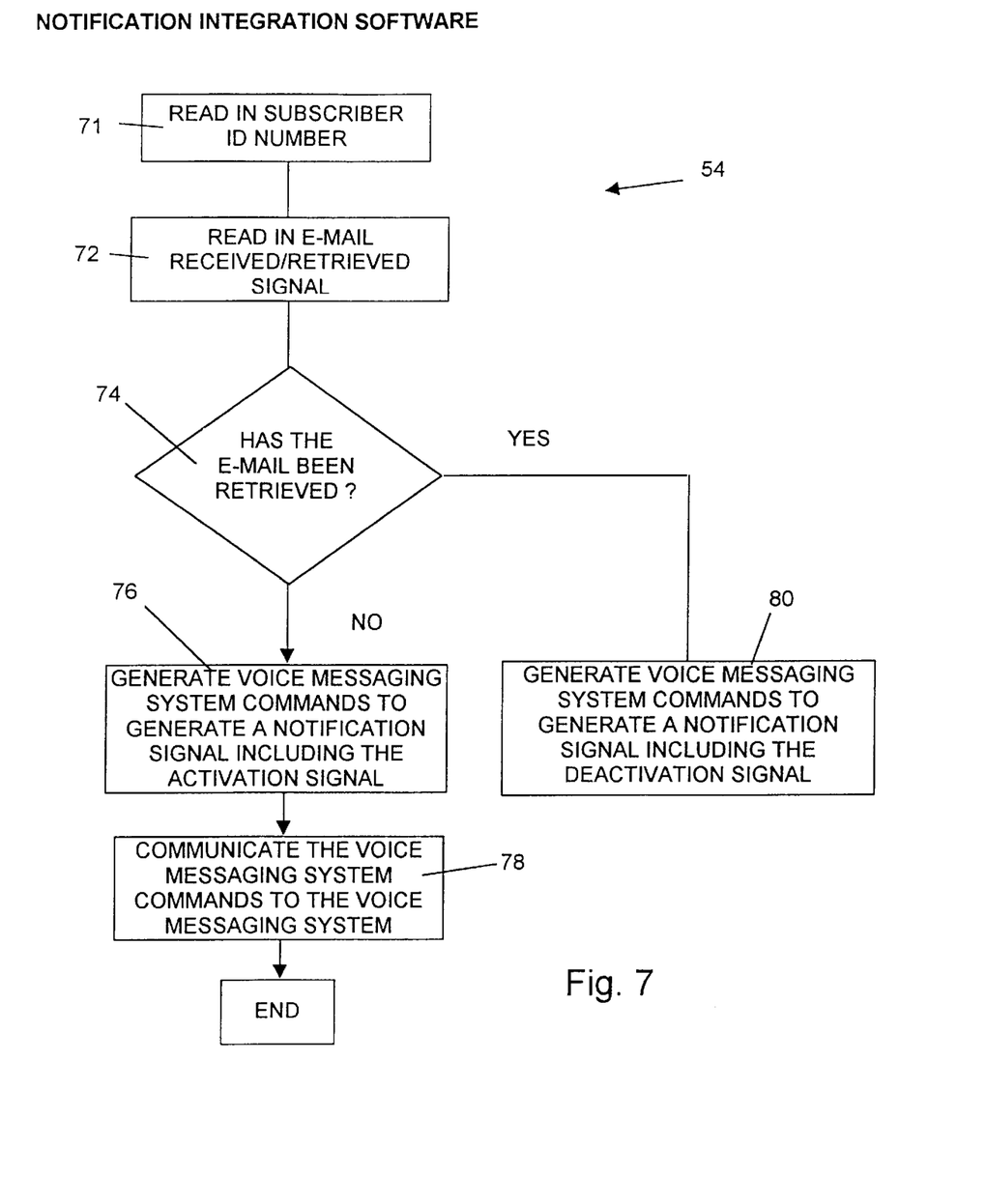
FIG. 7 is a flow chart showing the operation of the Notification Interface software.

Referring to FIGS. 1 and 7, the notification interface software 54 reads in 71 the subscriber identifier code 48 from the matching software 52, and reads in 72 the data signal 30. If the data signal 30 contains a message received signal 74 then the notification interface software 54 generates 76 the appropriate voice messaging system commands 56 and communicates 78 them to the voice messaging system visual message waiting signaling unit 42 instructing it to send a notification signal 26 containing an activation signal to the notification device 24. If the data signal 30 contains a message retrieved signal the notification interface software 54 generates 80 the appropriate voice messaging system commands 56 and communicates 78 them to the visual signaling unit 42 instructing it to send a notification signal 26 containing a deactivation signal to the notification device 24.

The telephone voice messaging system 23 can be any commercially available voice messaging system which can be adapted to integrate with the mail notification server 40.

Figure 2:
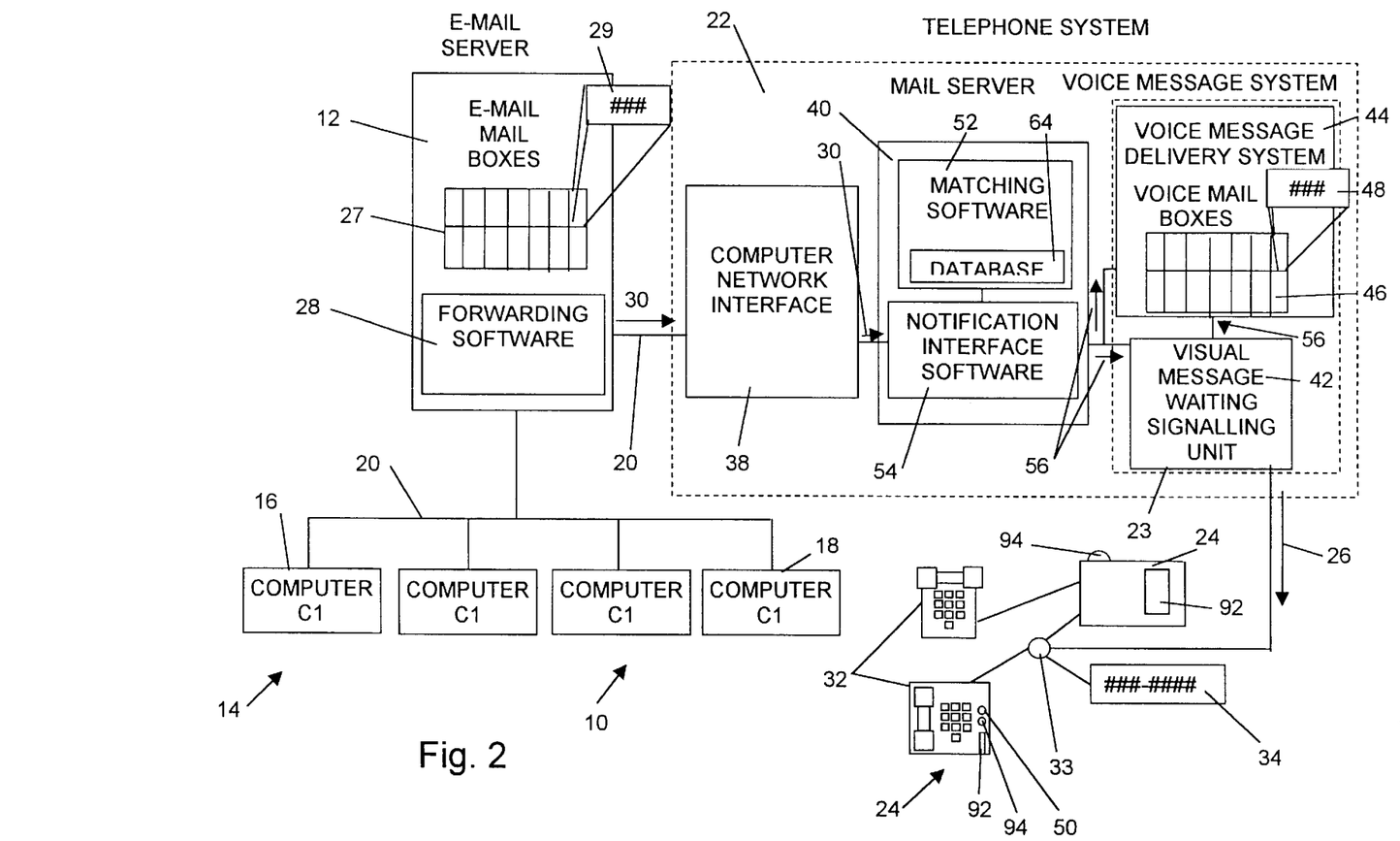
FIG. 2 is a schematic of the e-mail notification system utilizing a voice mail mailbox to store a predetermined voice message.

Commercially available voice messaging systems generally include a visual message waiting signaling unit 42 and a voice message delivery system 44, shown in FIG. 2. The voice message delivery system 44 generally includes a plurality of subscriber mailboxes 46, each having a subscriber identifier code 48 associated with it, for receiving voice mail messages over the telephone system 22. When a voice message is stored in the subscriber mailbox 46 the voice message delivery system 44 communicates that a message has been received to the visual message waiting signaling unit 42 which matches the subscriber identifier code 48 to the subscriber's phone number 34 and communicates a notification signal 26 via the telephone system 22 to the subscriber's telephone node 33 and telephone voice message indicator 50 indicating to the subscriber that a voice message is in the subscriber's voice mailbox 46. The subscriber dials into the voice messaging system 23 and recovers the voice message. Once the voice message has been recovered the visual signaling unit 42 again matches the subscriber identifier 48 to the phone number 34 and communicates a notification signal 26 over the data communication means 20 to the subscriber's telephone node 33 deactivating the voice message indicator 50.

The notification signal 26 generated by the visual signaling unit 42 is selectable between a notification means activation signal and a notification means deactivation signal. The notification means activation signal is generated by the visual signaling unit 42 in response to the voice message system 23 receiving the appropriate commands 56 from the notification interface software 52 in response to a message received signal from the e-mail server 12. Likewise, the notification means deactivation signal is generated by the visual signaling unit 42 in response to the appropriate commands 56 being communicated from the notification interface software 52 in response to an e-mail retrieved signal from the e-mail server 12. The activation and deactivation signals are standardized signals appropriate to the portion of the world in which the telephone system is located. In North America the Bellcore Message Waiting On and Off signals are used as activation and deactivation signals respectively.

The notification means 24 comprise an electronic circuit 92 arranged in a device connected to the telephone node 33 which is accessed by the subscriber's phone number 34. The notification means 24 separate from the telephone 32 or integrated into the telephone 32. The circuit 92 recognizes the notification means activation and deactivation signals and turns a voice message waiting light indicator 50 either on or off in response to the notification signal 26. The indicator 50 is an LED light which turns on in response to an activation signal and is turned off in response to a deactivation signal. Thus an individual checking for e-mail merely has to check the light 50. If the light 50 is on he has e-mail. If the light 50 is off then there is no e-mail.

Referring to FIGS. 1, 5, 6, and 7. In use e-mail is sent from the sending computer to the recipient's mailbox on the e-mail server 12. The forwarding software 28 resident on the e-mail server 12 monitors the status of the e-mail mailboxes 27 for activity. When a mailbox 27 receives e-mail from a sending computer 16 the forwarding software 28 generates a data signal 30 containing a message received signal and the mailbox recipient's identifier code 29 and communicates it to the telephone system 22. The message received signal and recipient identifier code 29 are received by the computer network interface means 38 and passed to the mail notification server 40 where the matching software 52 matches the recipient identifier code 29 to a corresponding subscriber identifier code 48. The subscriber identifier code 48 is then passed to the notification interface software 54 which generates the appropriate voice mail system commands 56. The notification interface software 54 then passes the subscriber identifier code 48 and the appropriate voice mail system commands 56 to the voice message system 23. The visual signaling unit 42 in response to the voice messaging system commands 56 matches the subscriber identifier code 48 to the subscriber's phone number 34 as it would for voice mail and generates a notification signal 26 which is sent using the subscriber's phone number 34 to the subscriber's telephone node 33 thereby activating the notification device 24 and indicating that an e-mail message has been received.

When e-mail is retrieved from the e-mail server 12 the forwarding software 28 generates a data signal 30 which now comprises an e-mail retrieved signal and the recipient's identification code 29. The data signal 30 is communicated to the mail notification server 40 and the matching software 50 matches the recipient identifier code 29 to the corresponding subscriber identifier code 48 and sends the appropriate commands and the subscriber identifier code 48 to the visual signaling unit 42. The visual signaling unit 42 matches the subscriber identifier code 48 to the subscriber's phone number 34 and sends a notification signal 26 comprising a deactivation signal to the notification device 24 at the subscriber's telephone node 33. In this manner the telephone company voice messaging system can be utilized to indicate that e-mail is present on the e-mail server with only minor additions and modifications.

In an alternative embodiment the notification device 24 may include an additional e-mail specific indicator light 94 and circuitry 92 on the phone 32, or in a separate unit from the telephone 32. If the notification device 24 is a separate unit it may be utilized with a telephone 32 having no indicator lights or circuitry, or may be utilized as a stand alone device connected to the telephone node 33 without a telephone 32.

In another alternative embodiment the notification device 24 may include a reset switch 95 for turning off the indicator light 50, or e-mail specific indicator light 94. This enables the notification device 24 to be utilized with the activation signal only and does not require the sending of a deactivation signal to turn off the indicator. In this embodiment the recipient does not have to retrieve the e-mail to turn off the indicator.

In another alternative embodiment a special e-mail waiting signal may be generated by the visual signaling unit 42 which is not a standard Bellcore signal. In this case the circuitry 92 in the notification device 24 would be arranged to receive the non standard e-mail waiting signal and turn an e-mail indicator light 94 on in response to the non standard activation signal and turn off the e-mail indicator light 94 in response to the non standard deactivation signal.

In another alternative embodiment the notification device may be arranged to flash the indicator light 50, or e-mail specific indicator light 94 indicating the number of e-mail messages that have been received. One example of this is as follows: if three messages have been received the indicator light 50, or e-mail specific indicator light 94 would repeat a sequence of three flashes with short intervals between, followed by a longer interval where the light 50 or 94 is off.

Another alternative embodiment of the automatic e-mail notification system 10 is shown in FIGS. 2 and 7. In this embodiment the telephone system voice messaging system 23 includes a voice message delivery system 44 which is utilized by the automatic e-mail notification system 10 to generate and store a predetermined voice message in response to the data signal 30 containing a message received signal from the e-mail server 12. The predetermined voice message is generated using currently available methods for generating and storing predetermined voice messages in a subscriber's voice mail mailbox 46. One example of a predetermined message which may be generated is "E-mail received". This message would be stored in the subscriber's voice mail mailbox 46 and would be available to the subscriber upon dialing in to the voice messaging system 23.

The notification interface software 54 is modified in this arrangement to utilized the voice message delivery system 44. The notification interface software 54 includes the operation of generating and sending 76 voice messaging system commands 56. This operation is modified to include the generation of commands 56 for controlling the voice message delivery system 44 as well as commands 56 for the visual signaling unit 42. The voice message system commands 56 instruct the voice message delivery system 44 to generate a predetermined voice message and store it in the subscriber's voice mail mailbox 46.

When the notification device 24 indicates that a message has been received the individual dials into the voice messaging system 23 and listens to the predetermined voice message to determine whether or not an e-mail message or a voice message is been received. Although this requires the individual to dial in to the voice messaging system it is still substantially faster than turning on a computer, linking to an Internet Service Provider, and checking one's e-mail mailbox.

When the notification interface software 54 receives a data signal 30 containing a message retrieved signal from the e-mail server 12 the notification interface software 54 generates and sends voice message system commands 56 to the voice message delivery system 44 instructing the voice message delivery system 44 to clear the predetermined message from the subscriber's voice mail mailbox 46 as well as instructing the visual signaling unit 42 to generate a notification signal 26 containing a deactivation signal.

Figure 3:
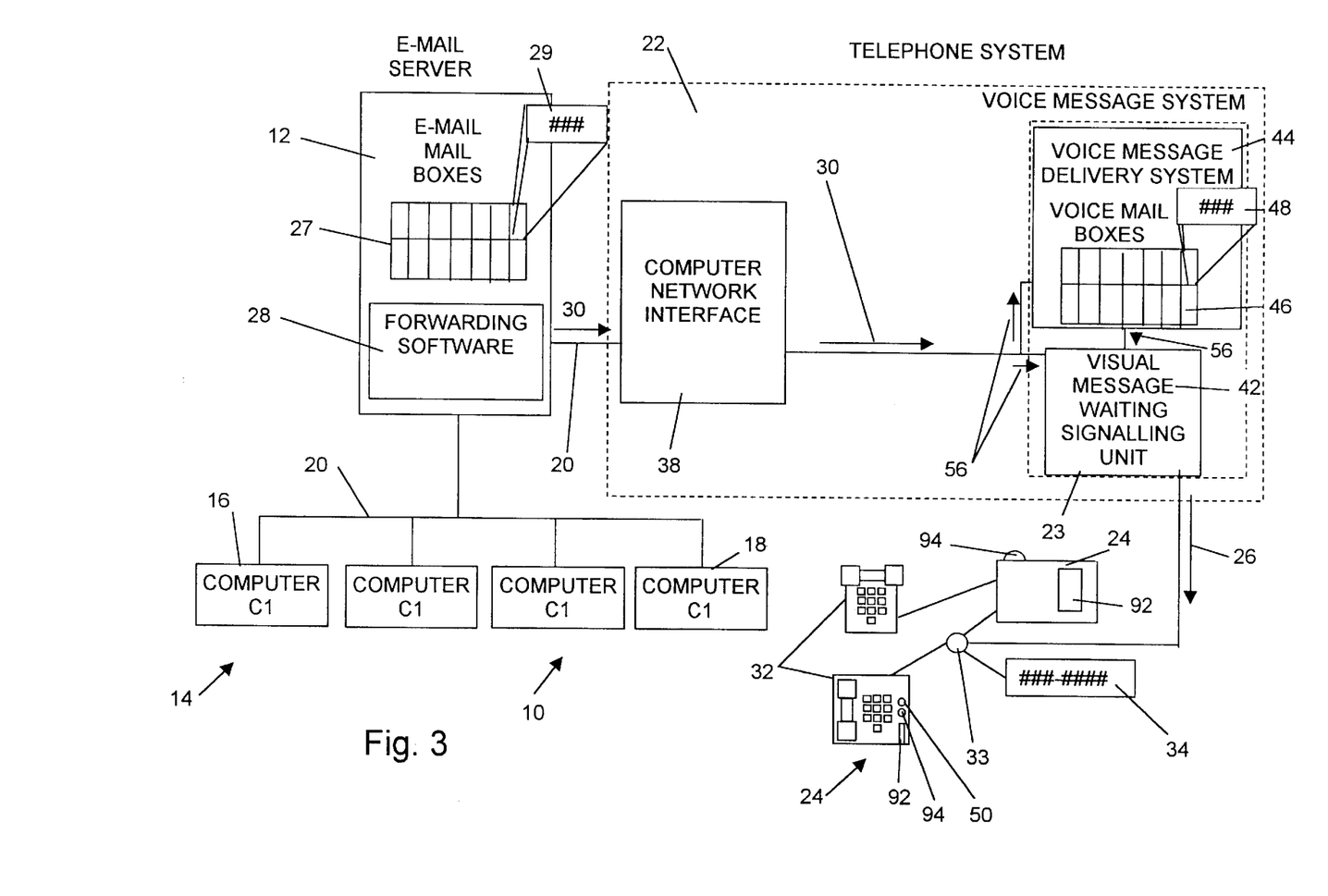
FIG. 3 is a schematic of the e-mail notification system with the notification interface software resident on the e-mail server.
Figure 8:
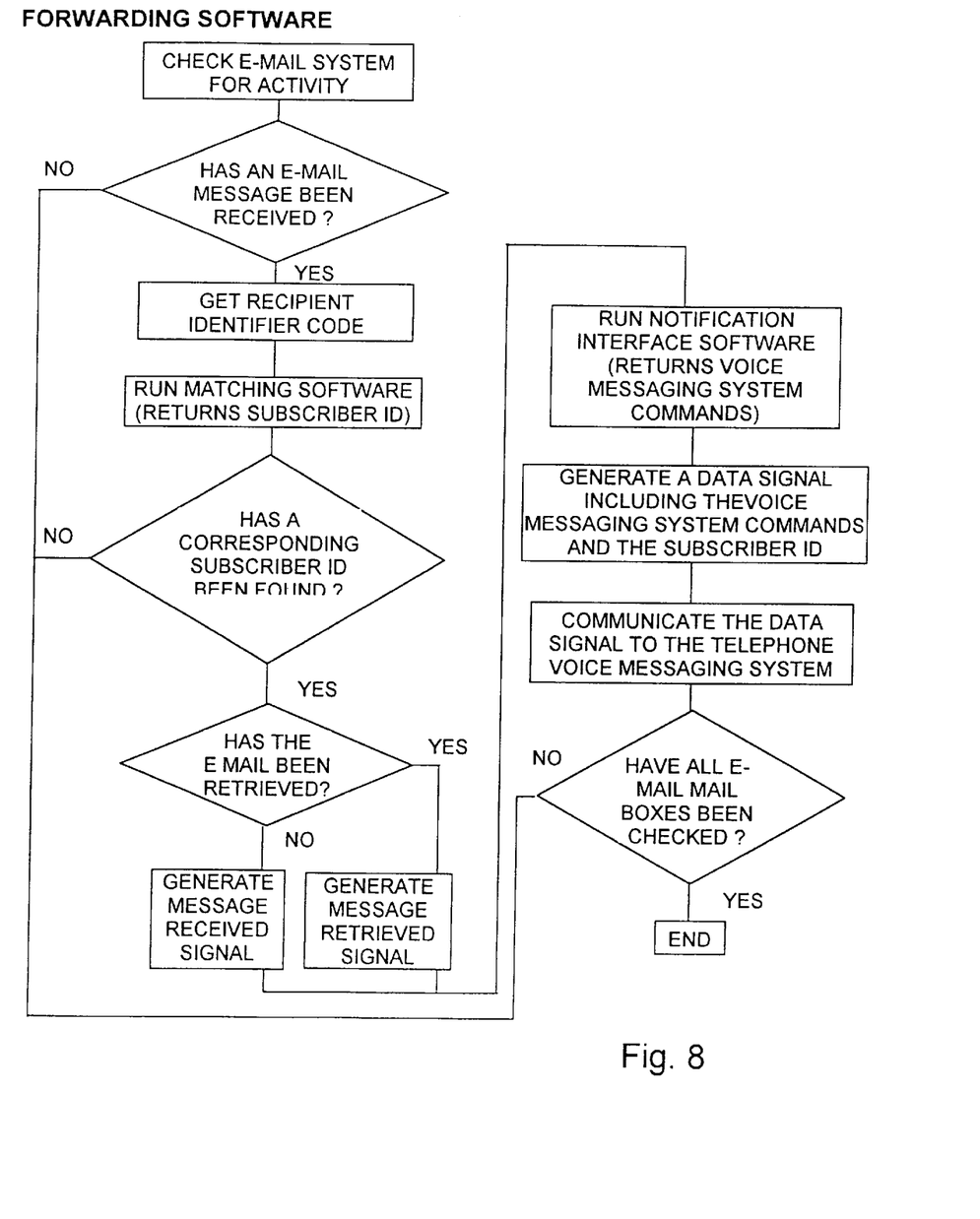
FIG. 8 is a flow chart showing an alternative operation of the Forwarding software.

Another alternative embodiment of the automatic e-mail notification system 10 is shown in FIGS. 3 and 8. In this embodiment the telephone system 22 does not include the mail notification server 40 but instead the matching software 52 and the notification interface software 54 are resident on the e-mail server 12 and are controlled by the forwarding software 28B which directly accesses the telephone system voice messaging system 23 sending the appropriate commands 56 to the voice message delivery system 44 and the visual signaling unit 42.

Referring to FIG. 8 the forwarding software 28B checks the e-mail system for activity 100. If an e-mail message has been received 102 in a mailbox 27 then the forwarding software 28B reads in 104 the recipient identifier code 29 and runs 106 the matching software 52. The matching software 52 matches the recipient identifier code 29 to a corresponding subscriber identifier code 48 in the data base 64. If no matching subscriber identifier code 48 is found 108 then the next mailbox 27 is checked. However if a matching subscriber identifier code 48 is found 110 and e-mail has been received 112 then a message received signal is generated 114 and the subscriber identifier code 48 and message received signal are passed 116 to the notification interface software 54. The notification interface software 54 generates the voice messaging system commands 56 for the voice messaging system 23 and passes them back to the forwarding software 28B. The forwarding software 28B generates 118 a data signal 30 containing the a subscriber identifier code 48 and the voice messaging system commands 56. The data signal 30 is communicated 120 to the voice messaging system 23 and the voice messaging system 23 generates a predetermined message storing it in a voice mailbox 46, and generates a notification signal 26 containing an activation signal.

If e-mail has been retrieved 112 then a message received signal is generated 122 and the subscriber identifier code 48 and message received signal are passed to the notification interface software 54. The notification interface software 54 generates 116 the voice messaging system commands 56 for the voice messaging system 23 and passes them back to the forwarding software 28B. The forwarding software 28B generates 118 a data signal 30 containing the a subscriber identifier code 48 and the voice messaging system commands 56. The data signal 30 is communicated 120 to the voice messaging system 23 and the voice messaging system 23 clears the predetermined message from the voice message delivery system 44 mailbox 46, and generates a notification signal 26 containing a deactivation signal.

Figure 4:
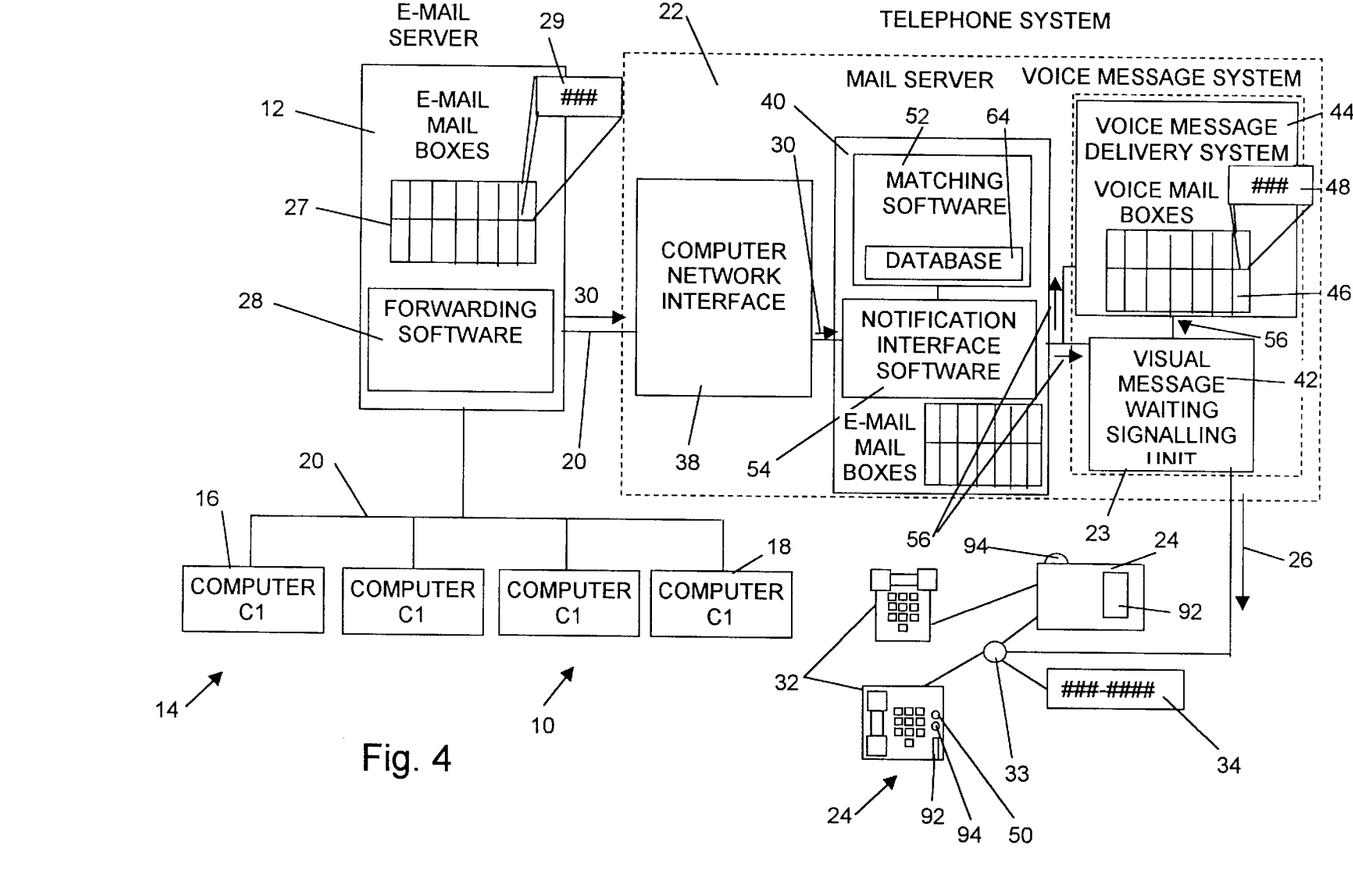
FIG. 4 is a schematic of the e-mail notification system arranged to communicate e-mail to a display unit on the notification means.

Referring to FIG. 4 another alternative embodiment of the automatic e-mail notification system 10 is shown. In this embodiment the automatic e-mail notification system includes a text display means 130. One example of this is a LCD screen for displaying the e-mail text to the screen or for displaying a predetermined message generated by the voice messaging system 23. When e-mail is received on the e-mail server 12 the forwarding software 28 includes the e-mail in the a data signal 30 which is communicated to the telephone system voice messaging system 23. The e-mail is then included in a notification signal 26 containing the activation signal for displaying on the display screen 130. In this manner the e-mail message can be sent from the e-mail server 12 to the notification device 24 or telephone 32. This allows an individual without a computer to receive e-mail through the telephone system.

Figure 9:
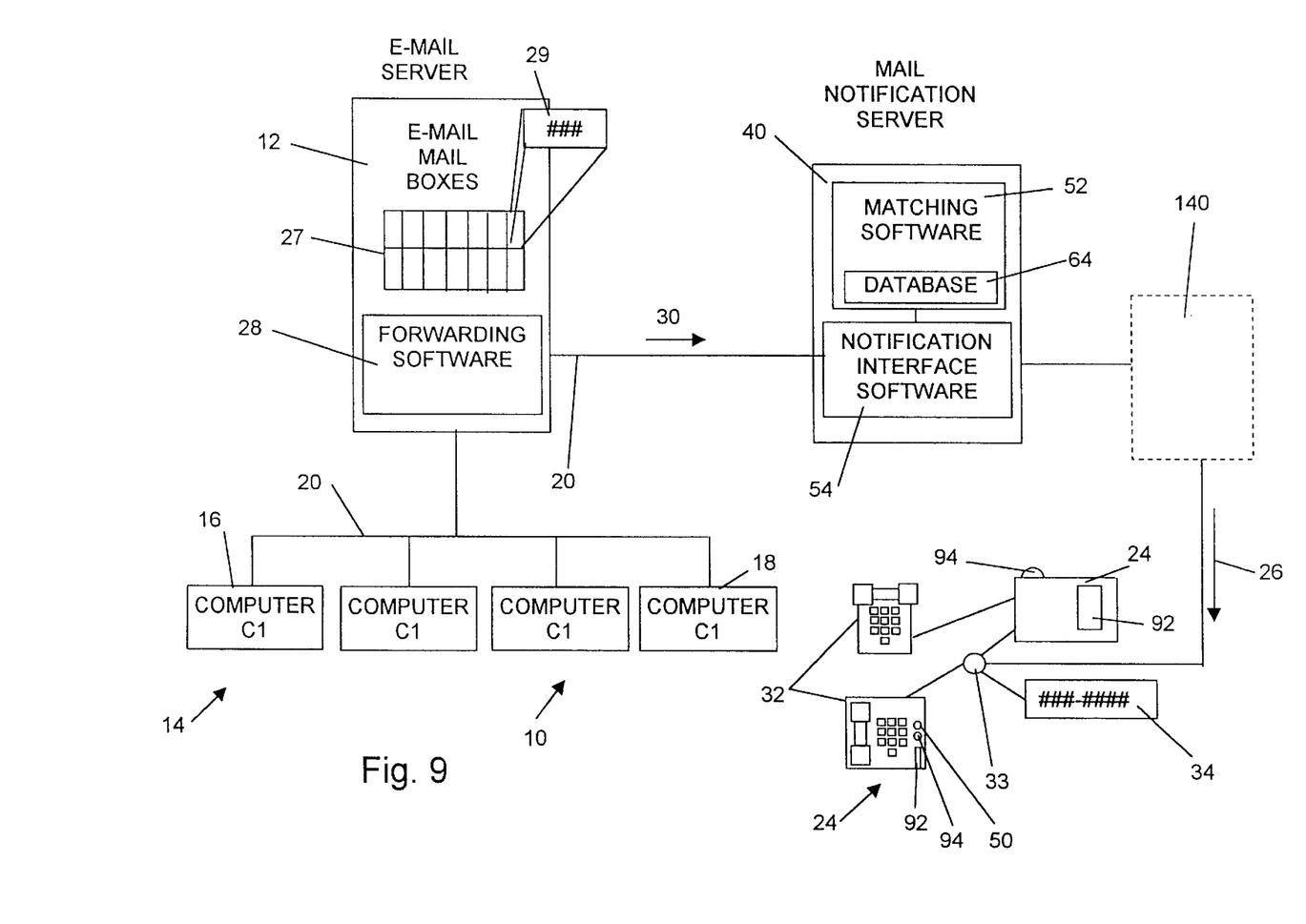
FIG. 9 is a schematic of the e-mail notification system with the notification interface software generating and sending a notification signal directly to the notification device.
Figure 10:
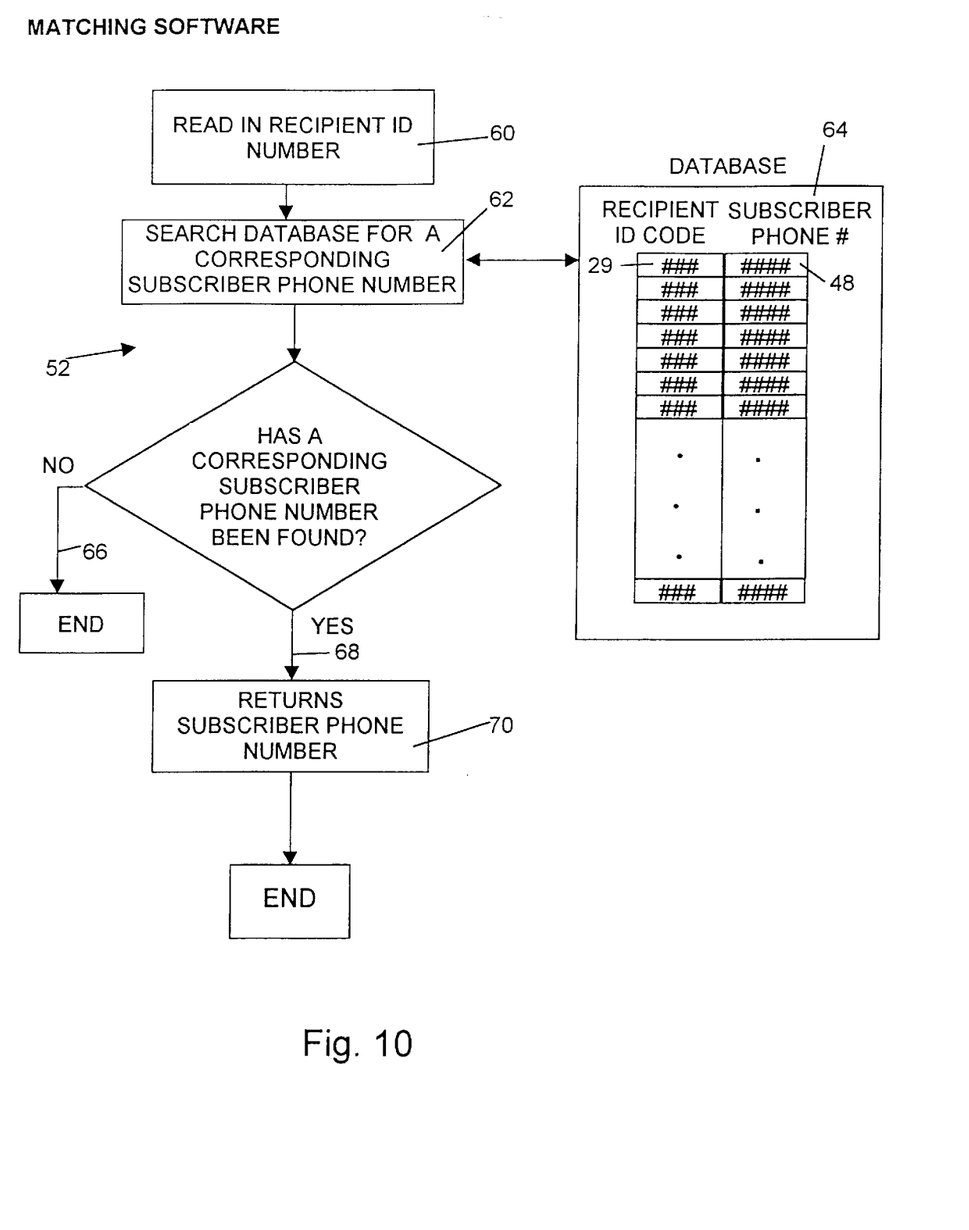
FIG. 10 is a flow chart showing an alternative operation of the Matching software.
Figure 11:
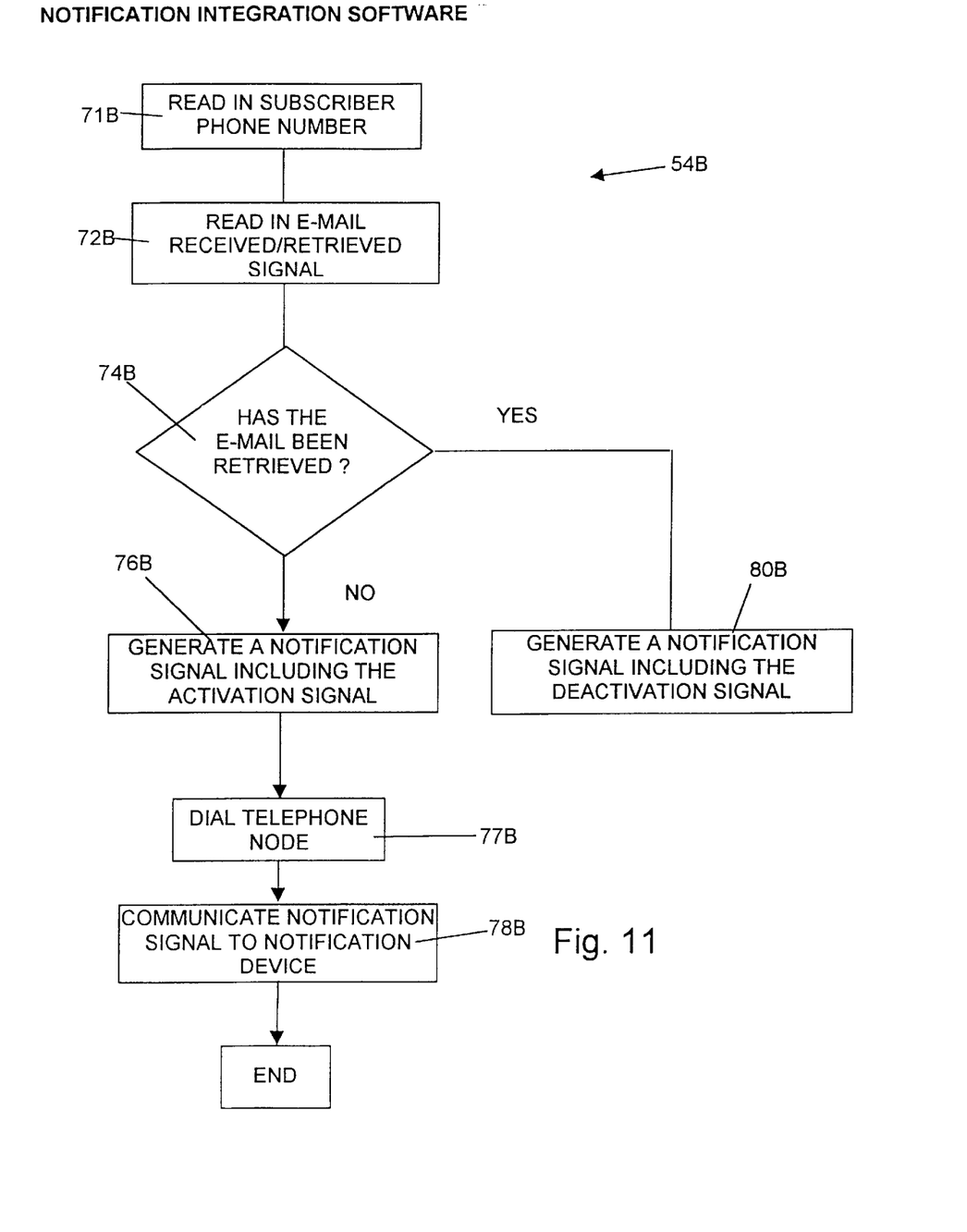
FIG. 11 is a flow chart showing an alternative operation of the Notification Interface software.

Another alternative embodiment of the automatic e-mail notification system 10 is shown in FIGS. 9, 10 and 11. In this embodiment the automatic e-mail notification system 10 is modified to by-pass the telephone system voice messaging system 23 and communicate a notification signal 26 directly to the notification device 24. This allows the mail notification server 40B to be located at any location where it can be connected to the data communication means 20 instead of being incorporated into a telephone system. In this embodiment the matching software and notification software are modified as follows.

The matching software 52B reads in 60B a recipient identifier code 29 and searches 62B a database 64B for a subscriber phone number 48B corresponding to the recipient identifier code 29. If no corresponding subscriber phone number 48B is found then the matching software ends 66 and no message is sent to the notification interface software 54B. If a corresponding subscriber phone number 48B is found the matching software passes 70B the subscriber phone number 48B to the notification interface software 54B.

Referring to FIGS. 9 and 11, the notification interface software 54B reads in 71 the subscriber phone number 48B from the matching software 52B, and reads in 72B the data signal 30. If the data signal 30 contains a message received signal 74B then the notification interface software 54B generates 76B a notification signal 26 containing an activation signal, dials 77B the telephone node 33 using the subscriber's telephone number 48B, and communicates 78B the notification signal 26 containing the activation signal to the notification device 24.

If the data signal 30 contains a message retrieved signal 74B then the notification interface software 54B generates 76B a notification signal 26 containing a deactivation signal, dials 77B the telephone node using the subscriber's telephone number 48B, and communicates 78B the notification signal 26 containing the deactivation signal to the notification device 24.

The operation of dialing 77B the telephone node 33 to direct the notification signal 26 over the data communication means 20 to an addressable node connected to the notification device 24 may be substituted for by any appropriate means of directing the notification signal 26 to an addressable node. The operation 77B utilizes a telephone system switching system 140 which directs the notification signal 26 to a telephone node. One example of an alternative means of directing the notification signal 26 is a cable system switching system to direct the notification signal 26 over a cable system to an addressable cable node similar to those currently being used to provide pay-per-view television.

The term "computer" used in the above is meant to be taken generally and includes any device which has a CPU for processing digital or analog information and which is capable of sending and receiving electronic mail.

While one embodiment of the present invention has been described in the foregoing, it is to be understood that other embodiments are possible within the scope of the invention. The invention is to be considered limited solely by the scope of the appended claims.

I claim:

1. An automatic electronic mail (e-mail) notification system for use with a computer based communications system and a telephone system, the commnunications system comprising:

a plurality of computers each having means for sending and receiving e-mail;

a network connecting the computers, the network including:

an e-mail server having means for receiving from the network e-mail messages addressed to selected recipients, and means for storing each of the e-mail messages in an addressable mail box having a recipient identifier associated therewith;

the telephone system comprising:

a plurality of telephone nodes, each node having a respective subscriber identifier;

a voice messaging system having a voice mail notification signal generator for generating a voice mail notification signal in response to the receipt of a voice mail message, and signal transmitting means for sending the voice mail notification signal to the telephone node corresponding to a subscriber identifier associated with the voice mail message;

the e-mail notification system comprising:

a recipient—subscriber correlator for correlating the recipient identifier of an e-mail message with a respective subscriber identifier;

an e-mail notification signal generator responsive to the receipt of an e-mail message by the e-mail server for actuating the voice mail system to send an e-mail notification signal the telephone node corresponding to the respective subscriber identifier; and notification means connected to each of the telephone nodes for notifying the recipient of the receipt of the e-mail by the e-mail server in response to receipt of the e-mail notification signal.

2. An automatic electronic mail notification system in accordance with claim 1 wherein the e-mail notification signal generator comprises an e-mail received signal generator for generating an e-mail received data signal in response to receipt of an e-mail message by the e-mail server and an e-mail retrieved data signal in response to retrieval of an e-mail message from the e-mail server.

3. An automatic electronic mail notification system in accordance with claim 2 wherein the e-mail received data signal includes the recipient identifier.

4. An automatic electronic mail notification system in accordance with claim 3 wherein the telephone messaging system includes the recipient—subscriber correlator.

5. An automatic electronic mail notification system in accordance with claim 2 wherein the e-mail server includes the recipient—subscriber correlator.

6. An automatic electronic mail notification system in accordance with claim 5 wherein each of the e-mail received data signal and the e-mail retrieved data signal includes the subscriber identifier.

7. An automatic electronic mail notification system in accordance with claim 2 wherein;

the voice messaging system generates a notification means activation signal in response to receipt of an e-mail received signal; and the voice messaging system generates a notification means deactivation signal in response to receipt of an e-mail retrieved signal.

8. An automatic electronic mail notification system in accordance with claim 1 wherein each subscriber identifier comprises a respective subscriber telephone number.

9. An automatic electronic mail notification system in accordance with claim 1 including an e-mail message communicator for communicating the e-mail message with the e-mail notification signal to the notification means.

10. An automatic electronic mail notification system in accordance with claim 9 wherein the notification means include display means for displaying the e-mail message.

\* \* \* \* \*